(12) United States Patent
Cao et al.

(10) Patent No.: US 9,113,742 B2
(45) Date of Patent: Aug. 25, 2015

(54) BEVERAGE BREWING PLATFORM

(71) Applicant: Sunbeam Products, Inc., Boca Raton, FL (US)

(72) Inventors: John Cao, Boca Raton, FL (US); Jennifer Hansard, Margate, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 133 days.

(21) Appl. No.: 13/787,086

(22) Filed: Mar. 6, 2013

(65) Prior Publication Data

US 2014/0251151 A1    Sep. 11, 2014

(51) Int. Cl.
| | | |
|---|---|---|
| A47J 31/00 | (2006.01) | |
| A47J 31/44 | (2006.01) | |
| A47G 19/14 | (2006.01) | |
| A47J 31/057 | (2006.01) | |
| A47J 31/06 | (2006.01) | |

(52) U.S. Cl.
CPC .............. *A47J 31/057* (2013.01); *A47J 31/06* (2013.01); *A47J 31/4403* (2013.01); *A47J 31/4467* (2013.01)

(58) Field of Classification Search
CPC ..... A47J 31/06; A47J 31/057; A47J 31/4403; A47J 31/4467
USPC ........ 99/295, 323, 279; 426/432, 433, 77, 78, 426/115; 220/666
See application file for complete search history.

(56) References Cited

U.S. PATENT DOCUMENTS

| | | | |
|---|---|---|---|
| 2,383,144 A * | 8/1945 | Moore | 99/285 |
| 4,867,993 A | 9/1989 | Nordskog | |
| 6,568,440 B1 * | 5/2003 | Engelbrecht | 141/338 |
| 7,081,263 B2 | 7/2006 | Albrecht | |
| D542,088 S | 5/2007 | Albrecht | |
| 7,258,884 B2 | 8/2007 | Albrecht | |
| 7,311,037 B2 | 12/2007 | Albrecht | |
| 7,644,653 B2 | 1/2010 | Bates | |
| 7,770,512 B2 | 8/2010 | Albrecht | |
| 2008/0057171 A1 | 3/2008 | Albrecht | |
| 2008/0216667 A1 * | 9/2008 | Garman et al. | 99/304 |
| 2008/0282897 A1 * | 11/2008 | Webster et al. | 99/280 |
| 2011/0000378 A1 | 1/2011 | Albrecht | |
| 2013/0078342 A1 * | 3/2013 | Loebl | 426/115 |

* cited by examiner

*Primary Examiner* — Dana Ross
*Assistant Examiner* — Lindsey C Teaters
(74) *Attorney, Agent, or Firm* — Michael J. Corrigan

(57) ABSTRACT

The present disclosure recites a beverage brewing system having beverage brewing machine and a collapsible brew basket. The beverage brewing machine has a housing with a water reservoir and an electrical heating element for heating water. An output system is provided for dispensing the heated water to the brew basket. The brew basket is a collapsible brew basket, positionable between a collapsed position and an expanded portion. The brew basket included and upper portion and a lower portion, the lower portion slidingly engaging the upper portion between the collapsed and the exposed position.

9 Claims, 4 Drawing Sheets

BEVERAGE BREWING PLATFORM

RELATED APPLICATIONS

The application claims priority to U.S. Patent Application Ser. No. 61/607,151 filed on Mar. 6, 2012, which is incorporated by reference as if fully rewritten herein.

FIELD OF THE INVENTION

The invention relates to a beverage brewing platform, and more particularly to a drip-typed beverage brewing machine and collapsible brew basket for use therein.

BACKGROUND OF THE INVENTION

Drip-type electric brewing machines have been in use for a many years as a means for making coffee or tea. The brewing machine typically include a cold water reservoir, an electric resistance heating element for heating the water, and a brew basket for holding a brewing material within a filter. To make a beverage, water is poured into the water reservoir and brewing material is placed in the filter, which is then placed in the brew basket. The water is heated by the electric heating element, and the heated water is dispensed from the water reservoir, through an output tube and shower head onto the brewing material. The brewed beverage then drips out into a receiving vessel, such as a coffee pot, cup, or the like, positioned below the brew basket. After brewing is complete, the filter and used beverage material in the brew basket and discarded.

Such brewing machines have been in use in homes and the hospitality industry, such as hotels, motels and the like. The brew baskets can be made of a hard plastic, which are cleaned after each use. Alternatively, the brew baskets can be disposable, being made of paper, cardboards, or soft plastic. Such brew baskets are designed for limited usage, after which they are discarded.

SUMMARY OF THE INVENTION

The present disclosure recites a beverage brewing system having beverage brewing machine and a collapsible brew basket. The beverage brewing machine includes a housing, with a water reservoir and an electrical heating element for heating water. A output system is provided for dispensing the heated water to the brew basket. The brew basket is a collapsible brew basket, positionable between a collapsed position and an expanded portion.

The brew basket includes an upper portion and a lower portion slidingly engaged within the upper portion, where the lower portion is movable with respect to the upper portion between an expanded position and a collapsed position. The upper portion includes a open top end, an open bottom end, and a substantially vertical side wall. A rim radially, outwardly, extends about the open top end and a flange radially, inwardly, extending about the open bottom end of the upper portion.

The lower portion includes a open top end, a bottom end, and a substantially vertical side wall, wherein the open top end has a radially, outwardly, extending flange and the bottom end has a surface defining at least one output opening. The lower portion is slidingly position within the upper portion so that the inwardly extending flange on the open bottom end of the upper portion engages the outwardly extending flange on the open top end of the lower portion to support the lower portion in the expanded position.

The upper portion include on the rim radially extending about the open top end a tab having at least one key element. Similarly, the brewing location in the brewing machine can include at least one machine key element, where the at least one machine key element is configured to receive the at least one key element on the brew basket. This allow for proper alignment of the brew basket within the brewing machine.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
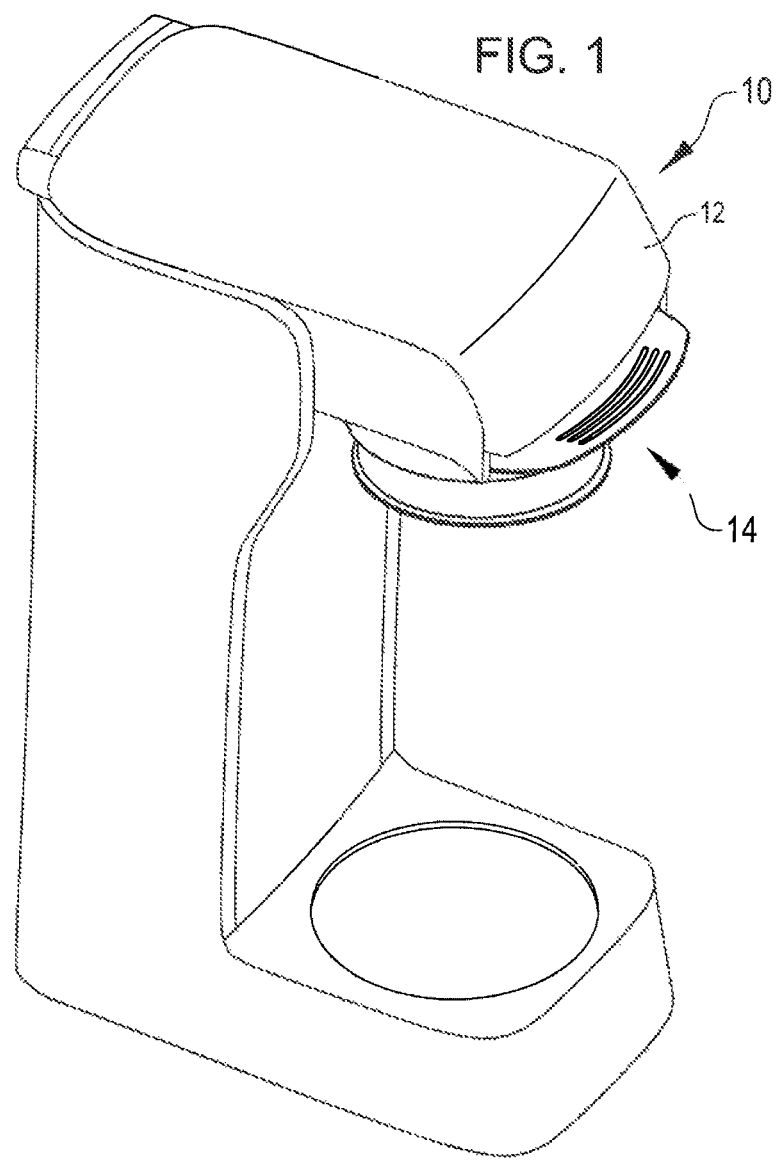
FIG. 1 depicts an isometric view of the beverage brewing system of the present disclosure.

Referring now to the drawing figures in which like reference designators refer to like elements, there is shown in FIG. 1 an automatic drip beverage maker 10 having an upper housing 12 configured to receive a brew basket 14, where the brew basket 14 is removeably positionable into the beverage maker 10. The beverage maker 10 includes a water reservoir and heating element, where the water reservoir is in fluid communication with the brew basket 14, such that as the water is heated, the heated water will be dispensed into the brew basket 14.

Figure 2:
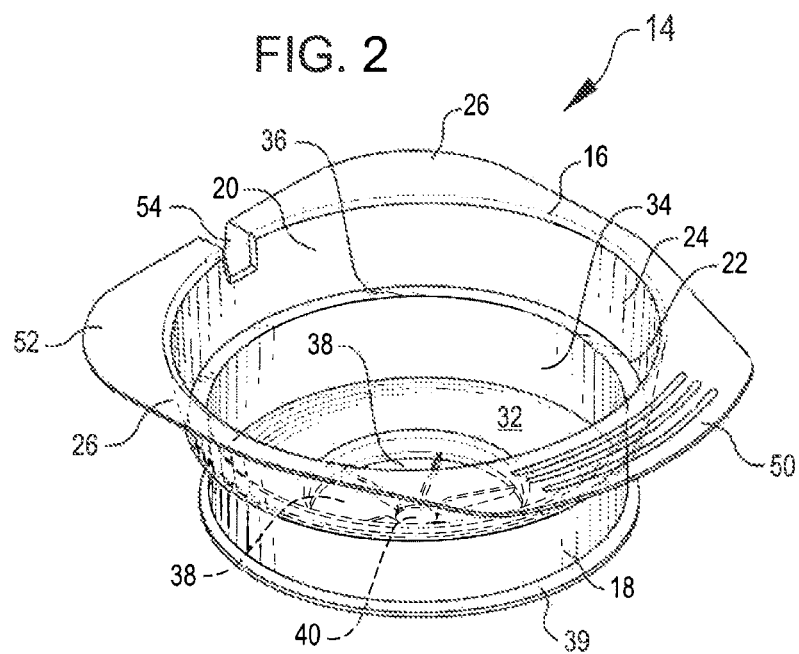
FIG. 2 depicts an isometric view of a brew basket for use in the brewing system of the present disclosure.
Figure 3:
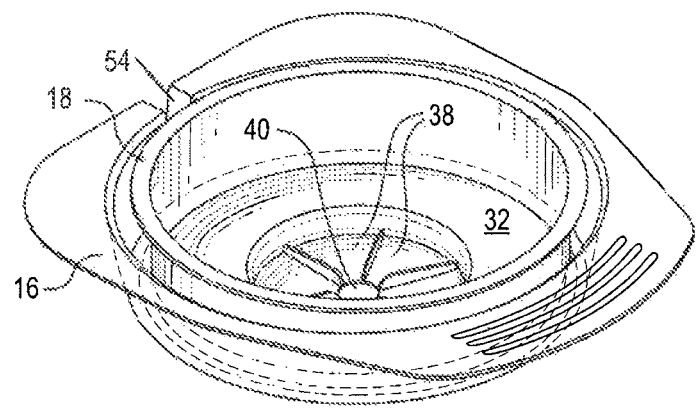
FIG. 3 depicts the brew basket of FIG. 2 in a collapsed position.
Figure 4:
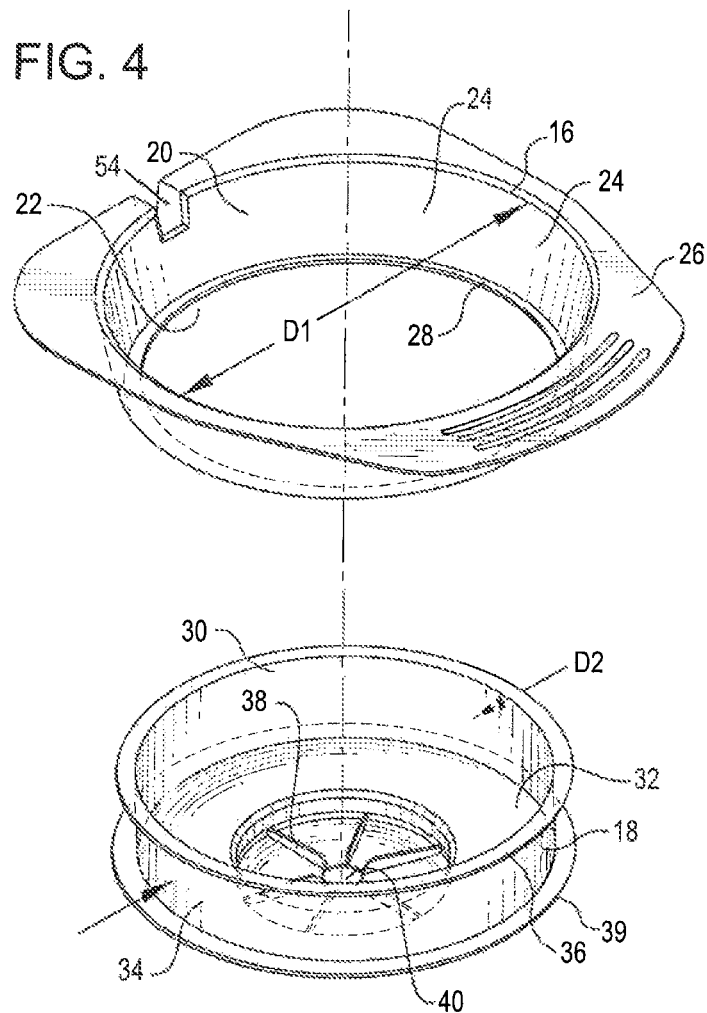
FIG. 4 depicts an exploded view of the brew basket of FIG. 2.

Referring to FIGS. 2-4, the brew basket 14 includes an upper portion 16 and a lower portion 18, which are slidingly connected. In this manner, the brew basket 14 may be used in an expanded configuration for the brewing and dispensing of the brewed beverage, and a collapses position for shipping and storage. The upper portion 16 of the brew basket 14 in substantially cylindrical in shape having an open top end 20, open bottom end 22, and substantially vertical side wall 24. The open top end 20 includes a radially, outwardly, extending rim 26 for supporting the brew basket 14 within the beverage maker 10. The open bottom end 22 includes a flange 28 for capturing and supporting the lower portion 18 of the brew basket 14.

The lower portion 18 of the brew basket includes a open top end 30, a bottom end 32, and a substantially vertical side wall 34. The open top end 30 includes a radially extending flange 36, configured to engage the flange 28 on the open bottom end 22 of the upper portion 16 of the brew basket 14. The upper and lower portions 16 and 18 are configured to be slideable with respect to each other between the collapsed and expanded configurations. In the expanded configuration, the flange 28 engages flange 36, capturing and supporting the lower portion 18 of the brew basket 14.

The bottom end 32 of the lower portion 18 include a bottom surface 38 having at least one opening 40 there through for dispensing the brewed beverage. The bottom surface 38 can be substantially flat, or in the alternative, provided at an angle, forming a substantially conical shape defining an opening 40 at the bottom thereof.

In an embodiment, the upper portion 16 of the brew basket 14 has a first diameter D1 and the lower portion 18 of the brew basket has a second diameter D2, where the first diameter D1 is greater than the second diameter D2. Flange 28 extends radially inward about the inner edge of open bottom end 22 of the upper portion 16, and flange 38 extends radially outward about the open top end 30 on the lower portion 18. In this manner, the lower portion 18 is slideable along the inside surface of the vertically side wall 24 of the upper portion 16.

The lower portion 18 can further include a flange 39 radially extending about the bottom end 32. The flange 39 prevents the removal of the lower portion 18 from the upper portion 16 when the brew basket 14 is in the collapsed configuration. In this configuration, the range of travel of the lower portion 18 with respect to the upper portion 16 is limit to be between flanges 38 and 39 on the lower portion 18.

In an alternative embodiment, the upper portion 16 of the brew basket 14 has a first diameter D1 and the lower portion 18 of the brew basket has a second diameter D2, where the first diameter D1 is less than the second diameter D2. Flange 28 extends radially outward about the open bottom end 22 of the upper portion 16, and flange 38 extends radially inward in the open top end 30 on the lower portion 18. In this manner, the lower portion 18 is slideable along the outside surface of the vertically side wall 24 of the upper portion 16.

Figure 5:
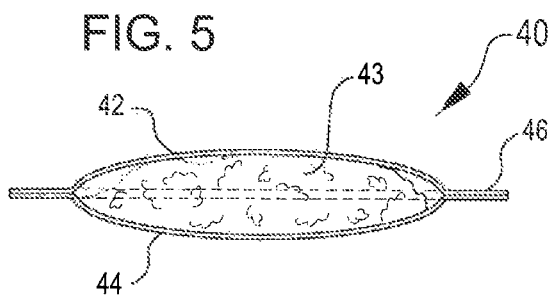
FIG. 5 depicts a filter pod for use in the beverage brewing system of the present disclosure.

Referring to FIG. 5, a filter pod 40 contains an prescribed amount of brewing material 43 packaged within it, between first and second sheets of filter material 42 and 44. The brewing material 43 can be coffee, tea, or the like. The sheets of filter material 42 and 44 are fixed to each other about their periphery, forming a pouch for placement of the brewing material 43 therein. The sheets 42 and 44 are secured around their periphery to form a flange 46.

The diameter of the filter pod 40 is selected such that the filter pod 40 will snuggly fit within the lower portion 18 of the brew basket 14, with the flange 46 being pressed against the vertical side wall 34 of the lower portion 18. When hot water is supplied to the brew basket 14, the flange 46 of the filter pod 40 will form a seal against the inner surface of the vertical side wall 34 of the lower portion 18 of the brew basket 14. In this manner, the hot water will be prevented from passing about the edges of the filter pod 40, having substantially all of the water passing through the filter pod 40, and brewing material 43 therein. As the hot water then passes through the filter pod 40, the water will be infused with the brewing material 43, and dispensed through the opening 40 in the bottom of the lower portion 18 of the brew basket 14.

In an embodiment, the radially extending rim 26 of the upper portion 16 of the brew basket 14 includes a tab 50 extending upwardly therefrom to allow user to lift up out of and insert the brew basket into the coffee maker 10. The rim 26 can include a second tab 52 extending outwardly therefrom, opposite tab 50. The second tab 52 can include one or more key element(s) 54. The key element(s) 54 is configured to engage corresponding key element(s) within the beverage maker 10.

Figure 6:
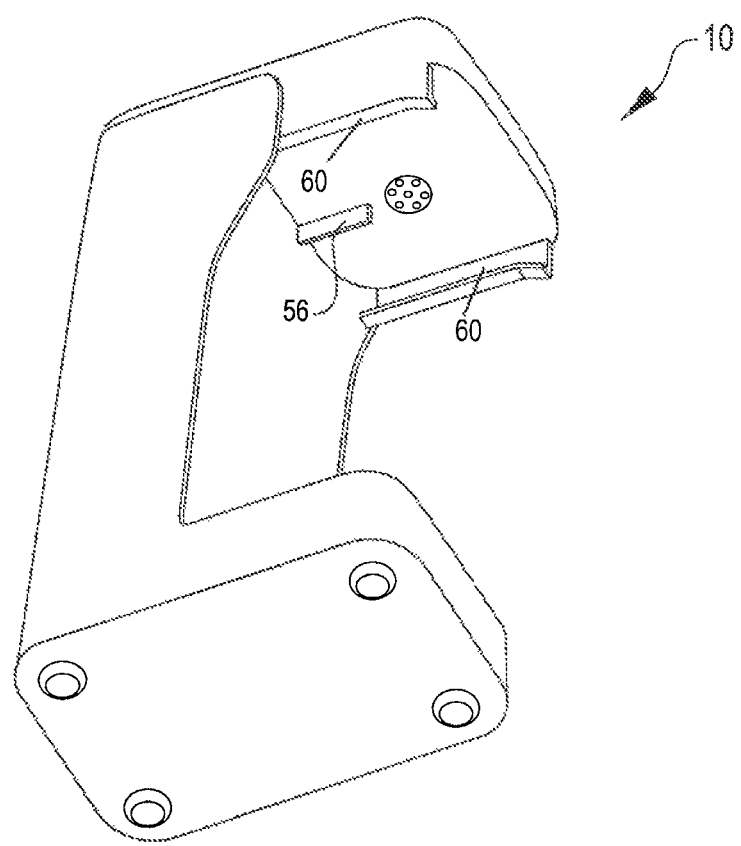
FIG. 6 depicts a bottom isometric view of a beverage brewing system for use with the brew basket of the present disclosure.

Referring to FIG. 6, the beverage maker 10 includes one or more key element(s) 56, configured to receive the brew basket 14 key element(s) 54 upon placement in to the beverage maker 10. The key elements 54 and 56 are configured and position such that upon placement of the brew basket 14 within the beverage maker 10, the brew basket 14 will be properly aligned within the beverage maker 10. A pair of guide rails 50, 50 on the underside of the beverage maker 10 facilitates placement of the brew basket 14 on the underside of the beverage maker 10.

The key elements 54 and 56 further provide the added benefit of preventing the usage of brew baskets within the coffee maker 10 they are not specifically design for use therein. This prevents the use amiss sized or miss aligned brew baskets with the coffee maker 10.

All references cited herein are expressly incorporated by reference in their entirety.

It will be appreciated by persons skilled in art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A beverage brewing system, comprising:
    a beverage brewing machine having a housing, a water reservoir, and an electrical heating element for heating water;
    a brew basket for use with the beverage brewing machine, the brew basket being positionable into a brewing location in the beverage brewing machine, the brew basket comprising an upper portion; and
    a lower portion slidingly engaged with the upper portion, the lower portion including a top end including a radially extending first flange having a first outer diameter and a bottom end including a radially extending second flange having a second outer diameter substantially similar to the first outer diameter of the first flange;
    wherein the brew basket is positionable between an expanded position and a collapsed position and the second flange is configured to prevent the removal of the lower portion from the upper portion when the brew basket is in the collapsed position.

2. The beverage brewing system as set forth in claim 1, wherein the lower portion is slidable along an inner surface of said upper portion.

3. The beverage brewing system as set forth in claim 1, where the upper portion includes an open top end, an open bottom end, a substantially vertical side and a rim radially, outwardly, extending about the open top end, where the rim includes a tab having at least one key element.

4. The beverage brewing system as set forth in claim 3, wherein the brewing location in the brewing machine includes at least one machine key element, where the at least one machine key element is configured to receive the at least one key element on the brew basket.

5. The beverage brewing system as set forth in claim 1, further including a pair of guide rails on the underside of the beverage brewing machine, wherein the pair of guide rails facilitate positioning the brew basket into the brewing location in the beverage brewing machine.

6. A collapsible brew basket positionable between a collapsed position and an expanded position, comprising:
    an upper portion including an open top end, an open first bottom end, a vertical side wall, a rim radially, outwardly, extending about the open top end, and a first flange radially, inwardly, extending about the open first bottom end;
    a lower portion including an open top end, a second bottom end, and a vertical side wall, wherein the open top end of the lower portion has a radially, outwardly, extending second flange having a second outer diameter, and a third flange radially extending about the second bottom end and the second bottom end has a surface defining at least one output opening, wherein the lower portion is slidingly positioned within the upper portion so that the inwardly extending first flange on the open first bottom end of the upper portion engages the outwardly extending second flange on the open top end of the lower portion to support the lower portion in the expanded position and the third flange prevents removal of the lower portion through the open first bottom end of the upper portion when the brew basket is in the collapsed position, the third flange having a third outer diameter substantially similar to the second outer diameter of the second flange.

7. The collapsible brew basket as set forth in claim 6, where the outwardly extending rim includes a tab having at least one key element configured to receive a corresponding key element within a beverage brewing machine thereby aligning the brew basket upon placement on the underside of the beverage brewing machine.

8. A beverage brewing system, comprising:
a beverage brewing machine having a housing, a water reservoir, an electrical heating element for heating water, and a pair of guide rails on the underside of the beverage brewing machine;
a brew basket for use with the beverage brewing machine, the brew basket being positionable into a brewing location in the beverage brewing machine facilitated by the pair of guide rails, the brew basket comprising an upper portion; and
a lower portion slidingly engaged with the upper portion, wherein the brew basket is positionable between an expanded position and a collapsed position.

9. The beverage brewing system of claim 8, wherein the brewing location in the brewing machine includes at least one machine key element, where the at least one machine key element is configured to receive the at least one key element on the brew basket.

* * * * *